May 14, 1946.  C. R. MOCKRIDGE ET AL  2,400,161
MULTIPLE ORIFICE THROTTLING DEVICE
Filed Aug. 24, 1943
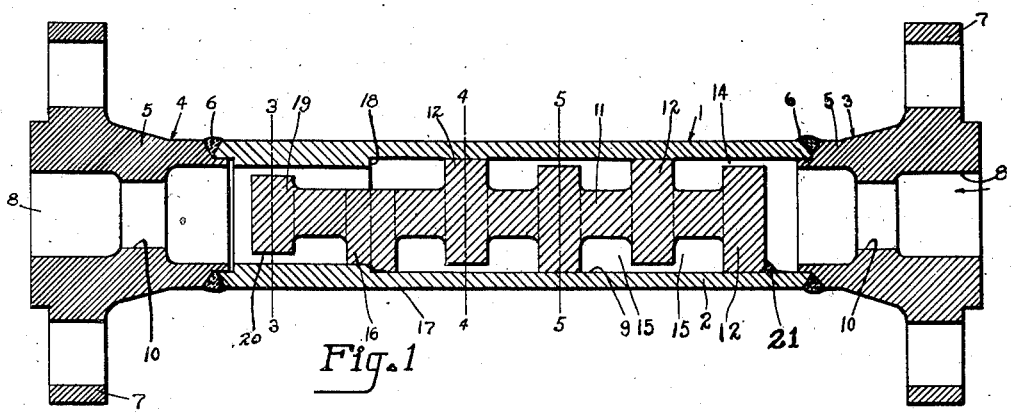
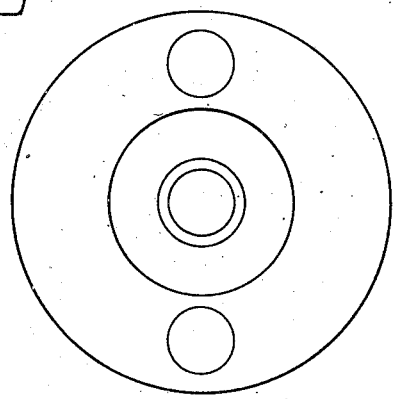
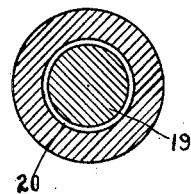
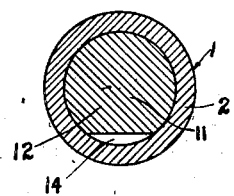
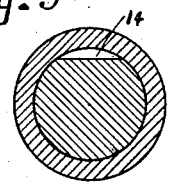
Chester R. Mockridge
Robert W. Allerton
INVENTORS
BY
ATTORNEY Patented May 14, 1946

2,400,161

UNITED STATES PATENT OFFICE 2,400,161

MULTIPLE ORIFICE THROTTLING DEVICE

Chester R. Mockridge, Nutley, and Robert W. Allerton, Short Hills, N. J., assignors to Worthington Pump and Machinery Corporation, Harrison, N. J., a corporation of Delaware Application August 24, 1943, Serial No. 499,780

1 Claim. (Cl. 138—42)

This invention relates to throttling devices, and more particularly to multiple pressure reducing orifice for bleeding predetermined fluid flows from a high pressure source to a low pressure source without appreciable noise or wear.

An object of the present invention is to provide a multiple pressure reducing orifice embodying a plurality of pressure drop stages each composed of a single orifice followed by a turbulence chamber, in which the pressure drop through each stage is limited so that noise and wear is kept at a minimum, and one in which despite a multiplicity of orifices used there is an absolute minimum of parts embodied in the structure.

With these and other objects in view, as may appear from the accompanying specification, the invention consists of various features of construction and combination of parts, which will be first described in connection with the accompanying drawing, showing a multiple orifice throttling device of a preferred form embodying the invention, and the features forming the invention will be specifically pointed out in the claim.

In the drawing:

Figure 1 is a longitudinal section through the multiple pressure reducing orifice structure.

Figure 2 is an end view of the multiple pressure reducing orifice structure.

Figure 3 is a cross-section on the line 3—3 of Figure 1.

Figure 4 is a cross-section on the line 4—4 of Figure 1.

Figure 5 is a cross-section on the line 5—5 of Figure 1.

The present multiple pressure reducing orifice structure is particularly designed for use in power plant systems such as in the boiler feed line to a boiler, the blow-down line from a boiler, and in other similar installations where it is desirable to pass a liquid under high pressure and relatively high velocity into a liquid or zone of lower pressure and velocity.

If a single pressure reducing orifice is employed in such a duty it has numerous disadvantages, such as excessive noise, excessive wear on the parts of the orifice as well as the improper direction of flow of the liquid after its pressure is reduced, resulting in cavitation or pitting of the pipe or conduit through which the fluid is flowing.

The present invention comprises a structure wherein the pressure and the velocity of the high pressure liquid is broken down in a series of stages thereby reducing noise and wear of such reduction to a minimum.

Referring particularly to the drawing, the multiple pressure break down orifice comprises a cylindrical housing or body 1 which is composed of the central section 2 to which are welded the inlet end section 3 and the outlet end section 4. The inlet and outlet sections 3 and 4 are substantially the same, each comprising the connecting portion 5 which is shouldered at its inner end to form a tight fit with the central cylindrical portion 2. The end sections 3 and 4 and the central portion 2 are welded together as indicated at 6 to form a strong, durable unitary housing or body. Attaching flanges 7 are formed on the end sections 3 and 4.

The end sections 3 and 4 are each provided with bores 8 which extend longitudinally and axially therethrough opening into the longitudinal bore 9 of the central section 2. The bores 8 of the inlet and outlet ends 3 and 4 have reduced portions 10 formed therein intermediate of their ends and outwardly of the inlet and outlet respectively of the multiple orifice pressure reducing portion of the device.

A spool 11 is inserted in and extends longitudinally of the central section 2. This spool has a plurality of annular flanges 12 formed thereon at spaced intervals along its length. In the construction of the spool, the flanges 12 are circular in shape and of a diameter to snugly fit the bore of the central section 2; however, prior to the insertion of the spool 11 into the central section 2, portions of the perimeter of the flanges are cut away as indicated at 14 to provide orifices. The amount of material cut away is determined by the conditions under which a multiple pressure reducing orifice structure is to be employed and, of course, the quantity of material cut away regulates the size of the pressure reducing orifices provided. As clearly shown in Figures 1, 4, and 5 of the drawing, the orifice formed by the cutting away of a part of one flange is disposed oppositely of the axis of the spool 11 from the cut away portion of the flange next thereto, and thus a sinuous, tortuous passage through the orifice structure is provided in which the fluid, the pressure of which is to be reduced, enters through the inlet and passes through the first orifice into the turbulence chamber 15 between the first and second flanges, and from the turbulence chamber or passage 15 through the second orifice into the second turbulence chamber and so on through the entire orifice structure.

The spool 11 has a sectional or fragmentary flange 16 formed thereon intermediate of its ends which has a shoulder 17 cut therein. The shoulder 17 abuts against a shoulder 18 formed in the bore 9 of the central section 2 for limiting the insertion of the spool 11 into the central section 2 and to insure proper positioning of the spool in the central section.

The flange 19 on the end of the spool 11 at the outlet end of the housing 1 is smaller in diameter than the flanges 12 thus providing an annular pressure reducing orifice 20 at the last stage of the pressure reduction of the fluid flowing through the device.

In the manufacture of the multiple pressure-reducing orifice structure, the central cylindrical section 2, the inlet section 3, outlet section 4 and the spools are all constructed in a dis-assembled arrangement with the flanges 12 of the spool complete, and prior to assembly of the device the flanges 12 are cut away as heretofore referred to to provide orifices of the desired and necessary size across each flange. The spool is then inserted into the central cylindrical section 2 of the housing 1 until the shoulder 17 contacts the shoulder 18 at which time the spool is welded to the central section as indicated by the welded joint 21. The inlet and outlet end sections 3 and 4 respectively are then connected to the central section 2 and welded thereto forming a complete unitary structure which is extremely simple in construction and embodies the minimum number of parts each of which can be manufactured in quantities and assembled to form multiple pressure reducing orifices to meet particular conditions merely by regulating the amount of the flanges which are cut away to regulate the size of the orifices.

It will be understood that the invention is not to be limited to the specific construction or arrangement of parts shown, but that they may be widely modified within the invention defined by the claim.

What is claimed is:

A multiple pressure reducing orifice comprising a cylindrical housing having a longitudinal bore opening out through the ends thereof to provide an inlet at one end and an outlet at the other end, a spool formed of a single piece of material extending longitudinally in said housing, a plurality of annular flanges formed on said spool and spaced apart along the length of the spool, said flanges having a diameter approximately equal to the interior diameter of the housing and having portions of their perimeter cut away to form orifice passages, said spool having said flanges thereon bearing against the wall face of said housing to co-act with said housing to form a turbulence chamber between each adjacent pair of said flanges, the cut away portions of said flanges being angularly offset with respect to one another and placing said turbulence chambers in communication one with the other, said spool being secured to said housing and having its ends terminating some distance inwardly from the respective ends of the housing.

CHESTER R. MOCKRIDGE.
ROBERT W. ALLERTON.